2,809,352

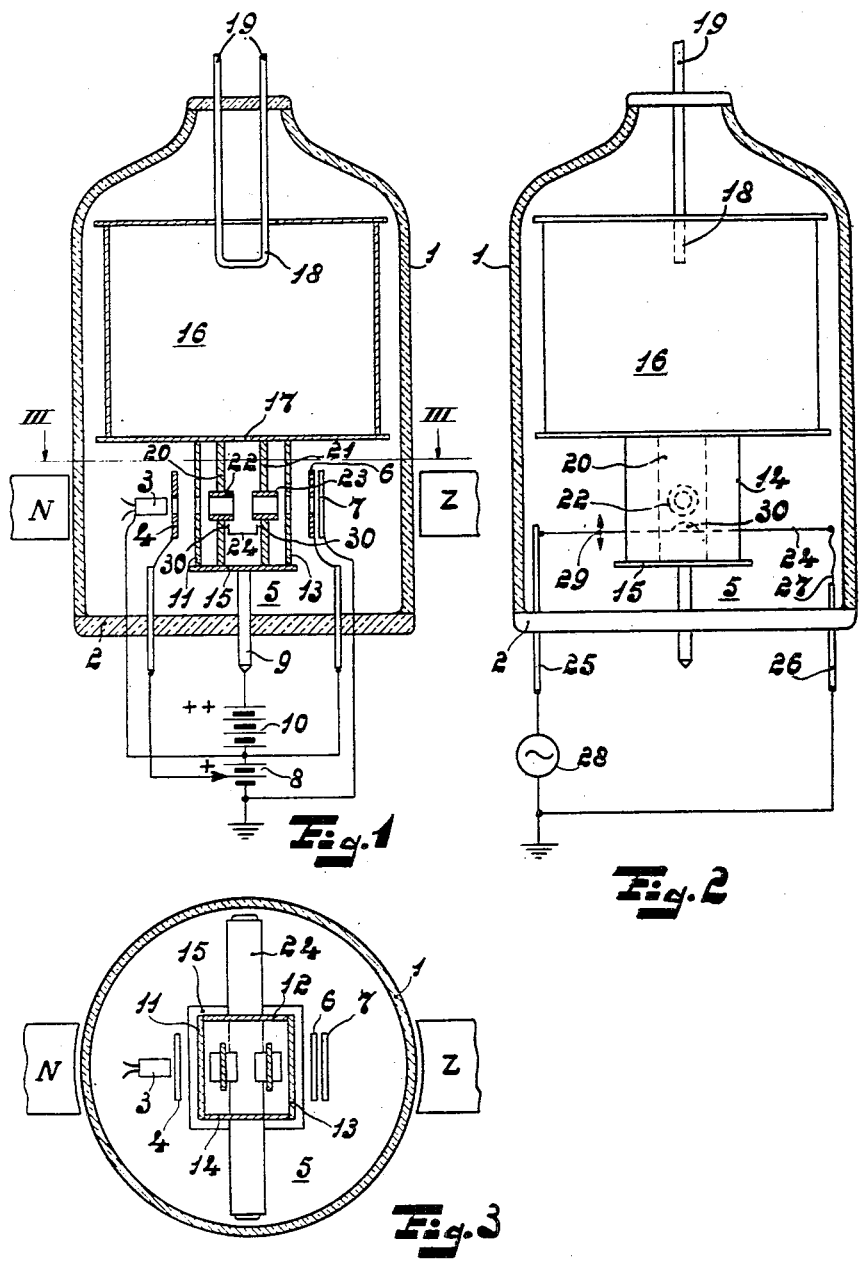
Oct. 8, 1957      F. COETERIER      2,809,352
DEVICE FOR PRODUCING FREQUENCY-MODULATED ULTRA SHORT WAVES
Filed July 29, 1954
INVENTOR
FREDERIK COETERIER
AGENT United States Patent Office 2,809,352
Patented Oct. 8, 1957

DEVICE FOR PRODUCING FREQUENCY-MODULATED ULTRA SHORT WAVES

Frederik Coeterier, Eindhoven, Netherlands, assignor, by mesne assignments, to North American Philips Company, Inc., New York, N. Y., a corporation of Delaware Application July 29, 1954, Serial No. 446,618

Claims priority, application Netherlands September 26, 1953

5 Claims. (Cl. 332—7)

The invention relates to a device for producing frequency-modulated ultra short waves, for example cm.- and dm.-waves, comprising an oscillator of the reflex-klystron type, in which the electron beam passes successive parts of a resonator cavity which are at right angles to the direction of the axis of the beam and use is made of an axial magnetic field for concentrating or focussing the beam.

For certain purposes, for example for radar marking transmitters, it is desirable to modulate in frequency the oscillations produced by such a klystron oscillator in a manner such that the fundamental frequency varies considerably, for example from 9200 mc./s. to 9400 mc./s. It is substantially impossible to achieve this by using the conventional electrical modulation methods.

The invention has for its object to provide particularly simple means, with the aid of which such a large frequency sweep can be obtained in devices of the kind described above.

According to the invention a metal tape to be connected to a source of modulation is mounted to this end in such devices in the resonator cavity between two of the successive parts thereof, this tape starting to oscillate under the action of the axial magnetic field upon being connected to the modulation source and thus producing frequency modulation of the oscillations from the oscillator by detuning the resonator cavity.

If the modulation is to be carried out only in one predetermined frequency, the mechanical resonance frequency of the metal tape is preferably chosen to be equal to the modulation frequency. The power then required for the modulation is extremely low.

The invention will now be described with reference to the accompanying drawing, in which Figs. 1 to 3 are a longitudinal sectional view, a lateral view and a cross sectional view respectively of a device comprising a klystron oscillator according to the invention.

The device shown in the figures comprises a discharge tube system housed in a cylindrical glass vessel 1 having a bottom 2. The tube system comprises a cathode 3 for producing an electron beam which passes in succession an intensity-control electrode 4 and a resonator cavity 5 and is then reflected by two reflector electrodes 6 and 7. As is shown in Fig. 1, the intensity control-electrode 4 and the reflector electrode 7 are at negative potential relative to the cathode 3, this potential being taken from the bias voltage battery 8. The reflector electrode 6 is bored and may be at the same potential as the cathode 3. The resonator cavity 5 is connected through a supporting pin 9 to a source of anode voltage 10.

The resonator cavity 5 is bounded laterally by four flat metal walls 11, 12, 13 and 14, of which the left-hand wall 11 and the right-hand wall 13 are provided with bores in order to allow the beam to pass. The resonator cavity is closed at the lower end by a flat metal plate 15 and communicates at the upper end with a cylindrical cavity resonator 16. The resonator cavity 5 and the cavity resonator 16 are coupled with one another through a coupling gap 17. Through the top side of the cavity resonator 16 is taken a coupling loop 18, by means of which output oscillations are derived through the output conductors 19 from the tube system.

In the resonator cavity 5 are housed centrally two parallel tape-shaped conductors 20 and 21, the length of which is about half the wavelength of the oscillations to be produced. The conductors 20 and 21 are provided with tubular members 22 and 23, which surround the electron beam. Upon passing through the resonator cavity 5, the electron beam thus passes in succession the left-hand wall 11, the tubular member 22 in conductor 20, the tubular member 23 in conductor 21 and the right-hand wall 13 of the resonator cavity. At the occurrence of electrical oscillations in the resonator cavity 5, the electron beam is subjected in the various gaps between the successive parts 11, 22, 23 and 13, to a velocity modulation which is converted into intensity modulation especially by the reflection of the electron beam at the reflector electrodes 6 and 7. With a correct choice of the direct voltages applied, the intensity-modulated, reflected electron beam gives off alternating-voltage energy to the resonator cavity 5, so that oscillations are maintained. The frequency of these oscillations is mainly determined by the tuning frequency of the parallel conductors 20 and 21. The oscillations thus produced excite the cavity resonator 16 through the coupling gap 17 and are derived therefrom through the coupling loop 18 and the conductors 19.

In order to concentrate the electron beam in the oscillator system described above it is common practice to use an axial magnetic field produced for example by a permanent magnet system N—Z situated outside the tube vessel 1.

Devices comprising a reflex-klystron oscillator of the kind described with reference to the figures are known per se and have proved to be particularly suitable for producing centimetre- and decimetre-waves.

In accordance with the invention provisions are made to modulate the oscillations in frequency by mechanical means. To this end a metal tape 24 is stretched and mounted between the parallel conductors 20 and 21 passed in succession by the electron beam, this tape protruding to the outside through recesses in the front wall and the rear wall 14 and 12 respectively of the resonator cavity 5 and being supported at the ends by supporting pins 25 and 26 provided in the bottom. The metal tape 24 is connected directly to the end of the supporting pin 25 with the interposition of a metal spring 27 to the supporting pin 26 in order to obtain a suitable mechanical bias tension of the tape 24. Through the supporting pins 25 and 26 the tape 24 is connected to a source 28 of modulation voltage. If the tape 24 is traversed by an alternating current emanating from the modulation voltage source 28, it is set oscillating under the action of the axial magnetic field N—Z, as is indicated at 29 by arrows in Fig. 2. The conductors 20 and 21 constitute in this case a Lecher system determining the oscillator frequency and having the length of half a wavelength. The tape 24 is at right angles to the direction of length of this Lecher system and constitutes a capacity lying between opposite points of the Lecher system having voltages in phase opposition. Upon oscillating, the tape is displaced in a vertical direction (Fig. 1), so that the area of the aforesaid capacity varies, which produces a variation of the electrical length of the Lecher system 20, 21. This alone suffices to vary the tuning frequency of the Lecher system. Moreover, the effective capacity of the tape 24 varies owing to the variation in capacity between this tape and the tubular members 22 and 23 and further parts of the resonator cavity 5. Thus the metal tape 24 constitutes a very effective expedient to detune the resonator cavity 5 and only small oscillation amplitudes are required to produce a considerable frequency modulation of the oscillations. A deviation of the tape of only a few millimetres at an oscillator frequency of about 9000 mc./s. suffices already to provide a frequency modulation of a few percent of the central frequency.

The metal tape 24 is preferably made of non-magnetic material, for example tungsten. In an experimental embodiment it was found that, after the mechanical resonance frequency of the tape had been rendered equal to the modulation frequency (for example 50 C./S.), in the presence of a magnetic field of a strength of about 1800 Gauss, a modulation power of about ½ w. was sufficient to obtain an oscillation amplitude of a few millimetres with a tape length of about 5 cms. and a tape width of about 2 mms. An increase in frequency sweep of the oscillations may be obtained by providing the tape 24 at the area of the conductors 20 and 21 with tags 30 bent upwards and increasing the effective capacity. Apart from the tape 24 provision may be made of additional metal tapes between the left-hand wall 11 and the conductor 20 on the one hand and between the conductor 21 and the right-hand wall 13 on the other hand, these tapes being fed from the modulation source in parallel combination with the tape 24.

With the use of devices according to the invention for radar marking transmitters it may be desirable to provide a modulation in a characteristic rhythm, for example dot-and-dash rhythm. With the device described above this may be achieved by including an auxiliary modulation voltage source, for example a high-frequency oscillator or a multivibrator for frequencies of about 0.3 to 1 mc./s. in a supply conductor of one of the tube electrodes.

In the device described above the frequency modulation by means of the tape 24 may produce a certain amplitude modulation. In general this will be low and hence will be no source of trouble for certain uses. A compensation of unwanted amplitude modulation may, if desired, be effected in a simple manner by supplying the frequency-modulation voltage in suitable amplitude and phase to for example the intensity control-electrode 4 of the resonator cavity 5.

What is claimed is:

1. In an oscillator of the reflex-klystron type including beam-producing means, a cavity resonator including a Lecher system of conductors traversed by the beam and excited into oscillation thereby and substantially determining the operating frequency of the oscillator, and magnetic field producing means producing a magnetic field aligned with the beam to maintain a focussed beam; means for frequency-modulating the oscillator comprising a metal tape vibrationally mounted within the Lecher system and within the magnetic field, and means for passing modulating current through the metal tape to thereby cause the latter to vibrate in a direction producing a variation in the electrical length of the Lecher system to thus frequency modulate the oscillator without any appreciable amplitude modulation thereof.

2. In an oscillator as set forth in claim 1 wherein the metal tape is constituted of tungsten.

3. In an oscillator as set forth in claim 1 wherein the mechanical resonant frequency of the metal tape is about the same as the frequency of the modulating current.

4. In an oscillator of the reflex-klystron type including axial-directed beam-producing means, a cavity resonator including a Lecher system of two parallel tape-like conductors mounted at right angles to the beam axis and having apertures traversed by the beam and being thus excited into oscillation thereby and having a length substantially determining the operating frequency of the oscillator, and magnetic field producing means producing a magnetic field axially aligned with the beam to maintain a focussed beam; means for frequency-modulating the oscillator comprising a metal tape vibrationally mounted within the Lecher system between the two parallel conductors and at right angles to the direction of length of the Lecher system and within the magnetic field, and means for passing modulating current through the metal tape to thereby cause the latter to vibrate in the direction of length of the Lecher system to thus vary the electrical length of the Lecher system and thus frequency modulate the oscillator without any appreciable amplitude modulation thereof.

5. In an oscillator as set forth in claim 4 wherein the sides of the metal tape adjacent the conductors are capacitatively coupled to the conductors on opposite sides thereof.

References Cited in the file of this patent
UNITED STATES PATENTS

| | | |
|---|---|---|
| 2,442,662 | Peterson | June 1, 1948 |
| 2,615,156 | Smith | Oct. 21, 1952 |